Oct. 22, 1968 R. K. BOOHER 3,407,339

VOLTAGE PROTECTION DEVICE UTILIZING A FIELD EFFECT TRANSISTOR

Filed May 2, 1966

INVENTOR.
ROBERT K. BOOHER

BY Robert G. Rogers

ATTORNEY

United States Patent Office 3,407,339
Patented Oct. 22, 1968

3,407,339

VOLTAGE PROTECTION DEVICE UTILIZING A FIELD EFFECT TRANSISTOR

Robert K. Booher, Downey, Calif., assignor to North American Rockwell Corporation, a corporation of Delaware Filed May 2, 1966, Ser. No. 546,937
5 Claims. (Cl. 317—33)

ABSTRACT OF THE DISCLOSURE

A voltage protection circuit for limiting the voltage on a line to within a permitted voltage range. The circuit comprises a field effect transistor, the gate and one electrode of which both are connected to the line to be protected. The other electrode is connected to a source of voltage which establishes one extreme of the permitted voltage range. The other extreme of the permitted voltage range is established by the forward conduction between the second electrode and the substrate of the transistor. The voltage source itself may comprise a plurality of series connected field effect transistors.

This invention relates to a device for protecting microelectronic components from excessive static electric charges and more particularly to a device for limiting the voltage on a line to a range of values which will insure protection of microelectronic components such as field effect transistors, etc. from excessive static electric charges.

In the process of packaging and transporting microelectronic components, static electric charges may build up and contact the leads of the components. If the charges are sufficiently large, the gate dielectric ruptures and causes permanent failure. The harmful effects of positive static charges, in the current state of the act, are eliminated by connecting the lead to an area which is diffused to the substrate so that a forward biased diode is formed. Negative static charges have been eliminated by altering the electric field around a similarly connected diode, so that it will break down at a relative low potential. Voltage levels of either negative or positive polarity which are in excess of an operating range safe for microelectronic components may also occur during operation of the components at times other than when the components are being packaged and transported.

Applicant's device provides a new and improved structure which protects components in a circuit from voltage levels in excess of the voltage swing permitted in the circuit, without the necessity for using an electronic field to cause diode breakdown. In one embodiment the structure comprises a first semiconductor device such as a field effect transistor connected for limiting the voltage on a first line to an operating range safe for microelectronic components connected to said line. The semiconductor device comprises a control electrode and a second electrode, both connected to the line. The device also includes a third electrode connected to a second line. The second line is connected to means providing a voltage to said third electrode which establishes one side of the swing of permitted voltage in the circuit. Also, the second electrode has a junction associated with it for limiting the voltage on the first line to a voltage level at the other side of the swing of permitted voltage. The junction is connected to an element, usually the substrate in which it was formed, which is at the voltage potential desired for the other side of the swing. It could be held at electrical ground or biased to some other value. Depending on the polarity of the voltage used in the circuit, and the devices, the first and second electrode may be either a drain or a source electrode comprising a portion of a field effect transistor.

The control electrode in that case would be a gate electrode.

The voltage on the second line, in one embodiment, is maintained at said level by means of a plurality of series connected semiconductor devices such as field effect transistors having combined threshold voltages equal to the voltage level. The maximum level can be changed by changing the number of devices connected in series.

The polarity of the semiconductor devices such as an *n* or *p* type, is selected after it is determined what voltage polarity is to be used for the circuit, in other words, whether or not the voltage to be used is negative or positive.

Therefore, it is an object of this invention to provide a structure for protecting microelectronic components from excessive static electric charges.

It is another object of this invention to protect field effect transistors, integrated circuits and other microelectronic components from excessive static electrical charges.

Still another object of this invention is to provide semiconductor devices connected to a line for limiting the voltage on the line to an operating range safe for microelectronic components connected to the line.

Still a further object of the invention is to provide a series of transistors connected for clamping a line at a voltage approximately equal to the combined threshold voltages of the transistors.

These and other objects of this invention will become more apparent in connection with the following drawings of which:

Figure 1:
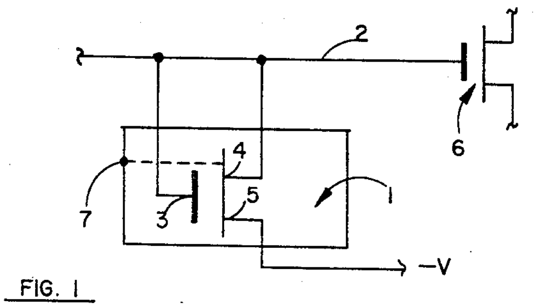
FIGURE 1 is an illustration of one embodiment of the invention.

Referring now to FIGURE 1, wherein is shown one embodiment of the protective device comprising field effect transistor 1 connected to line 2. Transistor 1 is comprised of gate electrode 3 and drain electrode 4 connected to line 2. Source electrode 5 is connected to a —V source The drain electrode is associated with a junction comprising a diffused region in the substrate. The diffused region forms a *pn* junction with the substrate material and if a positive voltage appears on the line, for the embodiment shown, the junction conducts and limits the voltage to a maximum positive value equivalent to the voltage across the junction when it is conducting. The junction is shown connected to substrate 7.

As indicated previously herein, the substrate may be biased to a different voltage so that the junction conducts at a negative voltage between —V and 0. It could be biased also to conduct at a voltage in excess of the slightly positive voltage described. For example, if the substrate is biased at —10 voltage with a *p* type transistor, then the junction would conduct at —9 volts and clamp one side of the voltage swing at that value. Relative to the substrate, line 1 would be slightly positive although relative to electrical ground or 0 the swing would still be negative. The other clamp or swing would be at —V which could also be referred with respect to the substrate instead of to 0 electrical ground.

Line 2 is connected to the gate electrode of field effect transistor 6, which is being protected by transistor 1. Integrated circuits, transistors, diodes and other microminiature devices can also be protected by the combination, although for this description, a field effect transistor is illustrated.

It is assumed that a voltage somewhat in excess of —V would damage the component to be protected.

Usually the —V is selected midway between the normal operating voltage for the circuit component and the maximum voltage which the components can withstand without damage.

In as much as different microelectronic components have different maximum voltage levels, it may be necessary to change —V depending on the particular component in the circuit. The threshold voltage of the first transistor must be also taken into consideration since it is effectively added to the —V appearing at the source electrode. For example, a standard MOS FET component may have a breakdown voltage of —40 volts. Therefore, —V would be clamped to —20 so that line 2 for the FIGURE 1 embodiment would never exceed —20 volts, plus the threshold voltage of the first transistor.

In operation, if a voltage in excess of —V appears on line 2 due to a static buildup, the transistor is rendered conductive and —V plus the threshold of transistor 1, appears on line 2 and no damage is caused to other components connected to the line.

In certain instances it is desirable to clamp —V at a constant value. Where the source potential can vary over a considerable range, unless it is held constant, it would be possible to exceed the safe voltage level of a component. Also, some means must be provided to establish a clamped reference to —V to protect components against static buildup.

Figure 2:
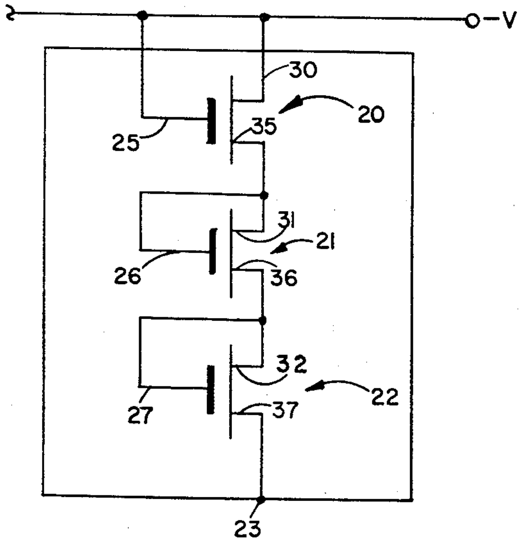
FIGURE 2 is an illustration of one embodiment of series connected transistors which limit a voltage to a negative value.

One embodiment of circuitry for accurately maintaining the —V level is shown in FIGURE 2. In the FIGURE 2 embodiment, field effect transistors 20, 21 and 22 are connected in series from the —V line to substrate 23 which may or may not be at electrical ground depending on how it is biased.

The gate electrodes 25, 26 and 27 of each transistor are connected to the respective drain electrodes 30, 31 and 32 of each transistor. The respective source electrodes 35 and 36 of each preceding transistor are connected to the drain electrode of a subsequent transistor to complete the series arrangement. The last source electrode of the series, 37, is connected to the substrate which is normally at ground potential.

Each transistor has a threshold voltage which must be overcome before it can conduct. In a particular embodiment, the number of devices times the threshold voltage for each device equals the voltage which will appear on the line. In effect, the line is clamped or limited to that maximum negative value.

For the particular embodiment shown, assume that each device has a —5 volt threshold voltage, and that it is required to clamp the line to —20 volts. Three devices are connected in series so that the threshold voltages of the three transistors plus the threshold voltage of the first transistor add to equal the desired constant potential.

If an excessive negative voltage appears instantaneously on line 2, transistor 1 will conduct as do transistors 20, 21 and 22. The combined threshold voltages of the four transistors add to, for example, —20 volts and limit the line 2 to that value. The same clamping effect results if excessive negative voltage appears on the —V line.

Figure 3:
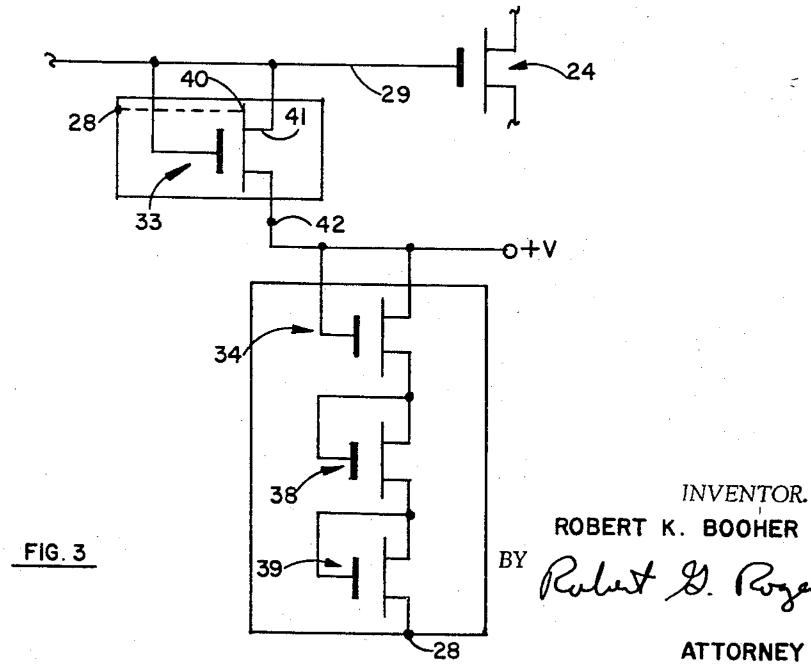
FIGURE 3 is an illustration of a second embodiment of the invention for clamping voltage to a desired swing.

Referring now to FIGURE 3, wherein is shown transistor 24 to be protected from one voltage swing in excess of +V and from another voltage swing in excess of the voltage established by junction 40 between source electrode 41 and substrate 28. The substrate may be at 0 volts or it may be biased at some other value such as $+V_1$. In the latter case the voltage swing would be between +V and $+V_1$.

If the substrate is approximately zero, one swing would be from a slightly negative voltage established by the junction drop.

If a voltage appearing on line 29 exceeds +V, transistor 33 conducts and clamps the line to the +V voltage appearing on line 42, plus the threshold voltages of transistor 33. Line 42 is limited to the +V voltage by the series combination of transistors 34, 38 and 39 which conduct in the presence of a voltage in excess of +V to clamp line 42 to the substrate value plus the combined threshold voltages.

It should be obvious from the description that the voltage swing may be of one voltage polarity of different voltage levels such as positive or negative levels or it may be a swing between two polarities such as between a positive and a negative value of vice versa.

Although the invention has been described and illustrated in detail, it is to be understood that the same is by way of illustration and example only, and is not to be taken by way of limitation; the spirit and scope of this invention being limited only by the terms of the appended claims.

I claim:

1. Circuit voltage protection means for limiting the voltage of a circuit to within a permitted voltage range, said protection means comprising:
   - a first field effect transistor having a substrate, a first electrode, a second electrode, and a control element, said second electrode and said control element each being connected to said circuit being protected, and
   - first means providing a voltage to said first electrode, whereby one extreme of said permitted voltage range is established by the voltage provided by said first means, the forward biased conduction from said second electrode to said substrate establishing the other extreme of said permitted voltage range.

2. The combination as recited in claim 1 wherein said first means providing a voltage comprises a plurality of series connected field effect transistors having combined threshold voltages equal to one extreme of said permitted voltage range.

3. The combination comprising first semiconductor means for limiting the voltage on a first line to an operating range safe for microelectronic components connected to said line, said semiconductor means comprising a control electrode and a second electrode connected to said line, and a third electrode connected to a second line having a first voltage level within said operating range, said second electrode having a junction associated therewith for limiting the voltage on said first line to a second voltage level, said operating range being within the said first and second voltage levels.

4. The combination as recited in claim 3 wherein the voltage on the second line is maintained at said first level by means of a plurality of series connected semiconductor means having combined threshold voltages equal to the voltage level.

5. The combination as recited in claim 3 wherein the voltage on the second line is maintained at said level by means of a plurality of series connected semiconductor devices having combined threshold voltages, said semiconductor devices comprise a first field effect transistor having a gate and first electrode connected to said second line and a second electrode connected to a second field effect transistor, said second transistor and each succeeding transistor of said plurality having their gate and first electrodes connected to the second electrode of a preceding transistor to form said series connected semiconductor devices, the final transistor of said series connected devices having its second electrode connected to a voltage reference, said reference voltage plus said combined threshold voltage being equal to said first level.

References Cited

UNITED STATES PATENTS 3,296,547 1/1967 Sickles ---------- 307—885 X

JOHN F. COUCH, *Primary Examiner.*

R. V. LUPO, *Assistant Examiner.*

Notice of Adverse Decisions in Interferences

In Interference No. 97,401 involving Patent No. 3,407,339, R. K. Booher, VOLTAGE PROTECTION DEVICE UTILIZING A FIELD EFFECT TRANSISTOR, final judgment adverse to the patentee was rendered Nov. 29, 1972, as to claims 1 and 3.

[*Official Gazette July 10, 1973.*]